(12) United States Patent
Nakamura et al.

(10) Patent No.: US 12,490,729 B2
(45) Date of Patent: Dec. 9, 2025

(54) DUAL-BEARING REEL

(71) Applicant: Shimano Inc., Osaka (JP)

(72) Inventors: Kouhei Nakamura, Osaka (JP);
Shunsaku Asaka, Osaka (JP)

(73) Assignee: Shimano Inc., Osaka (JP)

( * ) Notice: Subject to any disclaimer, the term of this patent is extended or adjusted under 35 U.S.C. 154(b) by 157 days.

(21) Appl. No.: 18/134,846

(22) Filed: Apr. 14, 2023

(65) Prior Publication Data

US 2023/0380397 A1   Nov. 30, 2023

(30) Foreign Application Priority Data

May 30, 2022 (JP) ................................. 2022-088051

(51) Int. Cl.
*A01K 89/01* (2006.01)
*A01K 89/015* (2006.01)
*A01K 89/033* (2006.01)

(52) U.S. Cl.
CPC ...... *A01K 89/046* (2015.05); *A01K 89/01931* (2015.05)

(58) Field of Classification Search
CPC ........ A01K 89/01555; A01K 89/01557; A01K 89/0186; A01K 89/0189; A01K 89/01909; A01K 89/01917; A01K 89/1093; A01K 89/01931
See application file for complete search history.

(56) References Cited

U.S. PATENT DOCUMENTS

| | | | | |
|---|---|---|---|---|
| 4,402,470 A | * | 9/1983 | Hamayasu ....... | A01K 89/01556 242/223 |
| 4,919,362 A | * | 4/1990 | Johansson ........ | A01K 89/01557 242/303 |
| 5,749,534 A | * | 5/1998 | Morimoto ........ | A01K 89/01555 188/164 |
| 9,999,210 B1 | * | 6/2018 | Kim ..................... | A01K 89/056 |

FOREIGN PATENT DOCUMENTS

JP   2000083537 A   * 3/2000
JP   2020-103064 A     7/2020

* cited by examiner

*Primary Examiner* — Emmanuel M Marcelo
(74) *Attorney, Agent, or Firm* — Global IP Counselors, LLP

(57) ABSTRACT

A dual bearing reel includes a spool having a bobbin trunk and first and second flanges, a spool shaft including a first supported portion on a first flange side and a second supported portion on a second flange side, and the spool shaft configured to integrally rotate with the spool, a reel body including a first body portion rotatably supporting the first supported portion and a second body portion rotatably supporting the second supported portion; a level-wind mechanism to move a fishing line guide along an axial direction of the spool shaft in reciprocating fashion in conjunction with the rotation of the spool, a first braking unit disposed in the first body portion facing the first flange and configured to brake the rotation of the spool, and a rotation transmission mechanism in the second body portion and configured to transmit the rotation of the spool to the level-wind mechanism.

10 Claims, 7 Drawing Sheets

DUAL-BEARING REEL

CROSS-REFERENCE TO RELATED APPLICATIONS

This application claims priority to Japanese Patent Application No. 2022-088051, filed on May 30, 2022. The entire disclosure of Japanese Patent Application No. 2022-088051 are hereby incorporated by reference.

BACKGROUND

Technical Field

The present disclosure relates to a dual-bearing reel.

Background Information

A conventional dual-bearing reel comprises a spool, a spool shaft, a reel body, a level-wind mechanism, a rotation transmission mechanism, and a braking unit. The spool integrally rotates with the spool shaft. The reel body rotatably supports the spool shaft. The level-wind mechanism moves a fishing line guide along the spool shaft axis direction in reciprocating fashion in conjunction with the rotation of the spool. The rotation transmission mechanism is disposed between the spool and the level-wind mechanism and transmits the rotation of the spool to the level-wind mechanism. The braking unit brakes the rotation transmission mechanism. In other words, the braking unit slows and/or stops the rotation of the spool indirectly by the rotation transmission mechanism.

SUMMARY

It has been determined that in a conventional dual-bearing reel, since the rotation transmission mechanism is positioned between the spool and the level-wind mechanism, it is difficult for the braking unit to directly brake the rotation of the spool. Thus, in the conventional dual-bearing reel, the braking unit brakes the rotation transmission mechanism in order to brake the rotation of the spool. In this type of dual-bearing reel, the braking unit brakes the spool indirectly via the rotation transmission mechanism, which makes it difficult to efficiently brake the rotation of the spool.

An object of the present disclosure is to disclose embodiments of a dual-bearing reel that can efficiently brake the rotation of the spool.

In regard to a first aspect of the present disclosure, a dual-bearing reel comprises a spool, a spool shaft, a reel body, a level-wind mechanism, a first braking unit, and a rotation transmission mechanism. The spool includes a bobbin trunk and first and second flanges. Fishing line can be wound around the bobbin trunk. The first and second flanges are located at opposite ends of the bobbin trunk. The first and second flanges extend from the bobbin trunk in the radial direction of the bobbin trunk.

The spool shaft has a first supported portion on the first flange side and a second supported portion on the second flange side. The spool shaft integrally rotates with the spool. The reel body has a first body portion that rotatably supports the first supported portion and a second body portion that rotatably supports the second supported portion. The level-wind mechanism, in conjunction with the rotation of the spool, moves a fishing line guide in the direction of the spool shaft axis in reciprocating fashion.

The first braking device brakes the rotation of the spool. The first braking unit is positioned in the first body portion facing the first flange. The rotation transmission mechanism transmits the rotation of the spool to the level-wind mechanism. The rotation transmission mechanism is disposed in the second body portion.

In the dual-bearing reel according to the first aspect of the present disclosure, the first braking unit is arranged in the first body portion, and the rotation transmission mechanism is arranged in the second body portion. In this state, the first braking unit is located facing the first flange of the spool and brakes the rotation of the spool. This configuration enables the first braking unit to directly brake the rotation of the spool via the first flange. That is, this dual-bearing reel can efficiently brake the rotation of the spool.

In regard to a second aspect of the present disclosure, the dual-bearing reel according to the first aspect further comprises a first adjustment unit. The first adjustment unit is disposed in the first body portion. The first adjustment unit adjusts a first braking force with which the first braking unit brakes the rotation of the spool.

In the dual-bearing reel according to the second aspect of the present disclosure, the first braking force of the first braking unit is adjusted by the first adjustment unit, so that the angler can easily adjust the desired first braking force.

In regard to a third aspect of the present disclosure, in the dual-bearing reel according to the first or second aspect, at least a part of the first flange includes a magnetic portion. The first braking unit has a magnet portion that is positioned facing the magnetic portion of the first flange.

In the dual-bearing reel according to the third aspect of the present disclosure, the rotation of the spool is braked by the arrangement of the magnet portion of the first braking unit facing the magnetic portion of the first flange. With this configuration, the rotation of the spool can be efficiently braked without bringing the first braking unit in contact with the first flange of the spool.

In regard to a fourth aspect of the present disclosure, in the dual-bearing reel according to the third aspect, the magnetic portion has a flat surface that facing the magnet portion.

In the dual-bearing reel according to the fourth aspect of the present disclosure, the magnet portion of the first braking unit is positioned facing the flat surface of the magnetic portion of the first flange, thereby securing more efficient braking of the rotation of the spool.

In regard to a fifth aspect of the present disclosure, in the dual-bearing reel according to any one of the second to fourth aspects, at least a part of the first flange includes a magnetic portion. The first braking unit has a magnet portion that is positioned facing the magnetic portion. The first adjustment unit adjusts the first braking force by varying the distance between the magnetic portion and the magnet portion.

In the dual-bearing reel according to the fifth aspect of the present disclosure, the first braking force can be easily adjusted as desired by the angler simply by varying the distance between the magnetic portion and the magnet portion.

In regard to a sixth aspect of the present disclosure, the dual-bearing reel according to the any one of the first to fifth aspects further comprises a drive mechanism. The drive mechanism transmits the rotation of the handle to the spool. The drive mechanism is disposed in the first body portion.

In the dual-bearing reel according to the sixth aspect of the present disclosure, the first braking unit and the drive mechanism are located in the first body portion. The rotation transmission mechanism is located in the second body portion. Even with this configuration, the first braking unit can directly brake the first flange of the spool. That is, in this dual-bearing reel, the rotation of the spool can be efficiently braked.

In regard to a seventh aspect of the present disclosure, the dual-bearing reel according to the any one of the first to sixth aspects further comprises a second braking unit (second brake). The second braking unit brakes the rotation of the spool. The second braking unit is disposed in the second body portion.

In the dual-bearing reel according to the seventh aspect of the present disclosure, the first braking unit is disposed in the first body portion and brakes the rotation of the spool. The second braking unit is disposed in the second body portion and brakes the rotation of the spool. In this configuration, the rotation of the spool can be braked by both the first and second braking units.

In regard to an eighth aspect of the present disclosure, in a dual-bearing reel according to the seventh aspect, the second braking unit contacts the second body portion as the spool rotates and brakes the spool by the force of friction.

In the dual-bearing reel according to the eighth aspect of the present disclosure, the second braking unit contacts the second body portion as the spool rotates and generates friction force on the spool. The rotation of the spool can thus be braked directly. That is, in this dual-bearing reel, the rotation of the spool can be braked efficiently.

In regard to a ninth aspect of the present disclosure, the dual-bearing reel according to the seventh or eighth aspect further comprises a second adjustment unit. The second adjustment unit is disposed in the second body portion. The second adjustment unit adjusts a second braking force with which the second braking unit brakes the rotation of the spool.

In the dual-bearing reel according to the ninth aspect of the present disclosure, the second braking force of the second braking unit is adjusted by the second adjustment unit, so that the second braking force can be easily adjusted as desired by the angler.

By the embodiments set forth in the present disclosure, the rotation of the spool in a dual-bearing reel can be braked efficiently.

DETAILED DESCRIPTION OF EMBODIMENTS

Figure 1:
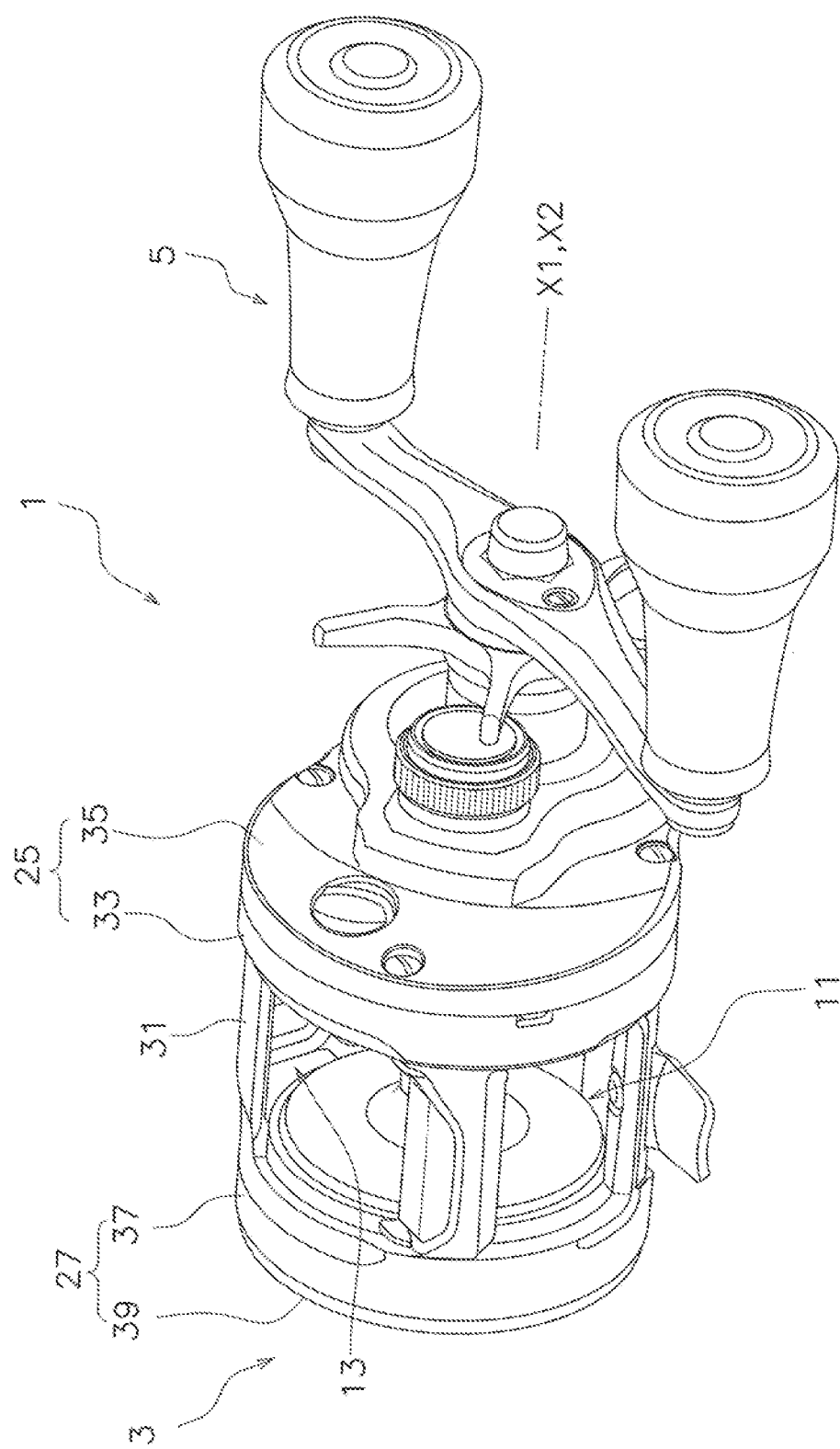
FIG. 1 is a perspective view of a dual-bearing reel.
Figure 2:
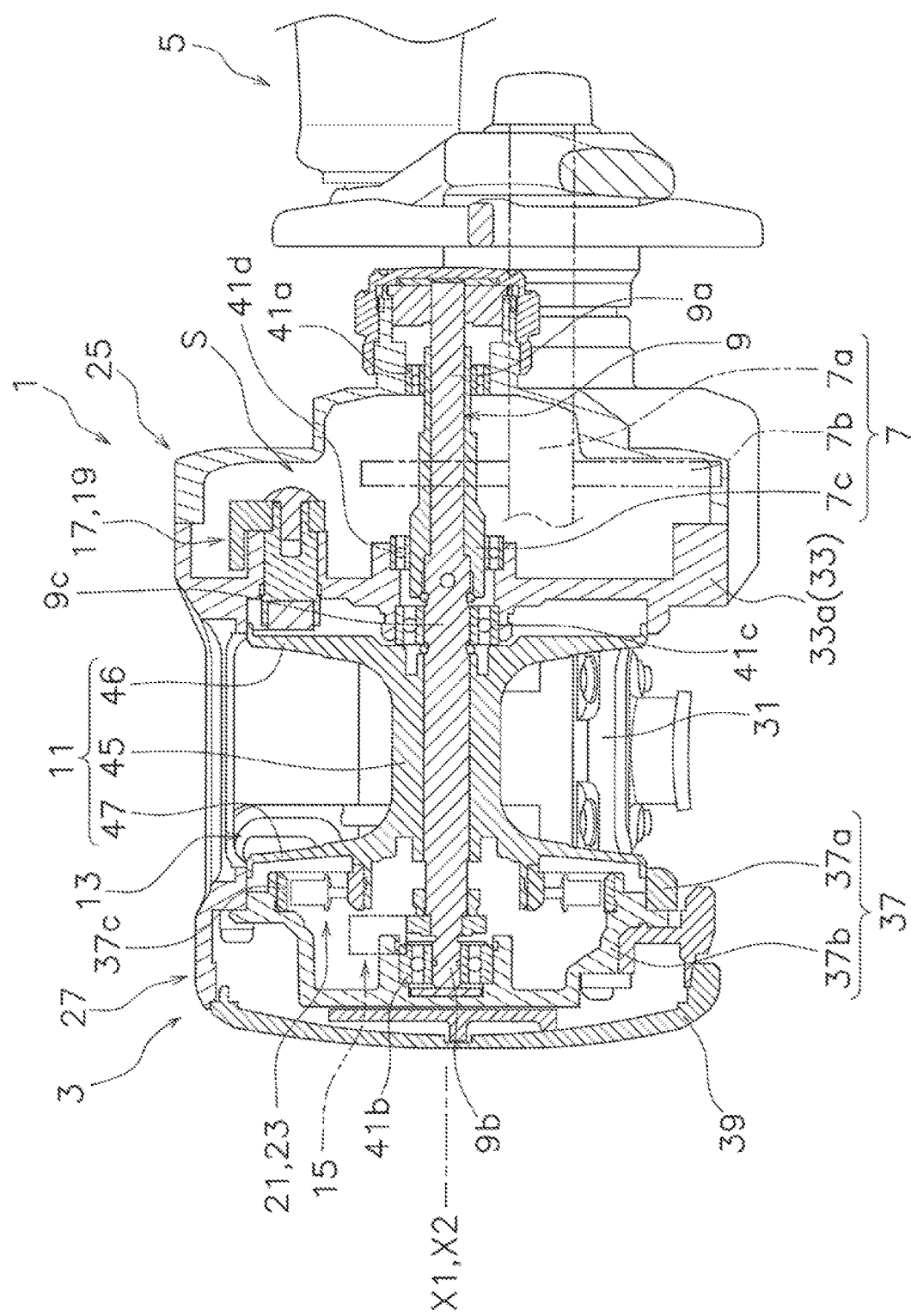
FIG. 2 is a cross-sectional view of the dual-bearing reel.

As shown in FIGS. 1 and 2, the dual-bearing reel 1 according to an embodiment of the present disclosure comprises a reel body 3, a handle 5, a drive mechanism 7, a spool shaft 9, a spool 11, a level-wind mechanism 13, and a rotation transmission mechanism 15. As shown in FIG. 2, the dual-bearing reel 1 further comprises a first braking unit (first brake) 17, a first adjustment unit 19, a second braking unit (second brake) 21, and a second adjustment unit 23.

As shown in FIG. 2, the direction in which axis X1 of the spool shaft 9 extends, or the direction along axis X1 of the spool shaft 9, is referred to as the "axial direction" in the following. Axis X1 of the spool shaft 9 is concentric with axis of rotation X2 of the spool 11. That is, the "axial direction" can be understood as the direction in which axis of rotation X2 of the spool 11 extends and/or the direction along axis of rotation X2 of the spool 11.

A direction away from axis X1 of the spool shaft 9 and/or a direction away from axis of rotation X2 of the spool 11 is referred to as the "radial direction." A direction around axis X1 of the spool shaft 9 and/or a direction around axis of rotation X2 of the spool 11 is referred to as the "circumferential direction."

Reel Body

As shown in FIGS. 1 and 2, the reel body 3 has a first body portion 25, a second body portion 27, and a connecting portion 31. The first body portion 25 has a first frame 33 and a first side cover 35, with the first frame 33 rotatably supporting the spool shaft 9.

As shown in FIG. 2, the first frame 33 includes a first side plate 33a positioned between the spool 11 and the handle 5 in the axial direction. For example, the first side plate 33a is positioned between the spool 11 and the first side cover 35 in the axial direction. The first side cover 35 is positioned between the handle 5 and the first frame 33.

The first side cover 35 is attached to the first frame 33 so as to cover the first side plate 33a, and such that an internal space S is formed between the first side cover 35 and the first side plate 33a. The first side cover 35 rotatably supports the spool shaft 9.

As shown in FIGS. 1 and 2, the second body portion 27 is positioned facing the first body portion 25 in the axial direction. The second body portion 27 has a second frame 37 and a second side cover 39. As shown in FIG. 2, the second frame 37 rotatably supports the spool shaft 9. For example, the second frame 37 rotatably supports a second end portion 9b (described further below) of the spool shaft 9.

Specifically, the second frame 37 includes a second side plate 37a and a spool shaft support portion 37b. The second side plate 37a is positioned facing the first side plate 33a in the axial direction. The spool shaft support portion 37b is attached to the second side plate 37a. The spool shaft support portion 37b rotatably supports the spool shaft 9. A contact ring 37c is fixed to the spool shaft support portion 37b. A contact portion 63 of the second braking unit 21, described further below, comes in contact with the contact ring 37c.

The second side cover 39 is attached to the second frame 37 so as to cover the second frame 37. For example, the second side cover 39 is attached to the second side plate 37a so as to cover the spool shaft support portion 37b.

The connecting portion 31 connects the first body portion 25 and the second body portion 27. For example, the connecting portion 31 connects the first frame 33 and the second frame 37. The connecting portion 31 is integrally formed with the first frame 33 and the second frame 37.

Handle

As shown in FIG. 1, the handle 5 is rotatably supported by the reel body 3. For example, as shown in FIG. 2, the handle 5 is connected to the drive mechanism 7. The handle 5 is rotatably supported by the reel body 3 via the drive mechanism 7.

Drive Mechanism

As shown in FIG. 2, the drive mechanism 7 transmits the rotation of the handle 5 to the spool 11, and is arranged in the first body portion 25. For example, the drive mechanism 7 is arranged in the internal space S between the first side cover 35 and the first side plate 33a. The drive mechanism 7 includes a handle shaft 7a, a drive gear 7b, and a pinion gear 7c.

The handle shaft 7a is rotatably supported by the first body portion 25. For example, the handle shaft 7a is rotatably supported by the first side cover 35 and the first frame 33. The handle 5 is attached to the handle shaft 7a.

The handle 5 rotates integrally with the handle shaft 7a. The drive gear 7b is attached to the handle shaft 7a. The drive gear 7b integrally rotates with the handle shaft 7a, and meshes with the pinion gear 7c.

The pinion gear 7c is cylindrical and is disposed on the radially outward side of the spool shaft 9. The pinion gear 7c is rotatably supported by the first side cover 35 via a bearing 41a, and is rotatably supported by the first side plate 33a via a bearing 41d. The rotation of the pinion gear 7c is transmitted to the spool shaft 9 via a clutch mechanism. Since the clutch mechanism has the same structure as a conventional clutch mechanism, its detailed description is omitted here.

In the drive mechanism 7, the rotation of the handle 5 is transmitted to the pinion gear 7c via the handle shaft 7a and the drive gear 7b. When the clutch mechanism is on, the rotation of the pinion gear 7c is transmitted to the spool shaft 9. When the clutch mechanism is off, on the other hand, the rotation of the pinion gear 7c is not transmitted to the spool shaft 9.

Spool Shaft

As shown in FIG. 2, the spool shaft 9 has a first end portion 9a, the second end portion 9b (one example of the second supported portion), and a central portion 9c (one example of the first supported portion). The spool shaft 9 also has an annular groove 10.

The first end portion 9a is the end portion on the side of the first side cover 35. The first end portion 9a is rotatably supported by the first side cover 35 via the bearing 41a.

The second end portion 9b is located on the side of second flange 47 of the spool 11, which flange is described further below. For example, the second end portion 9b is located on the second body portion 27 side. Specifically, the second end portion 9b is located on the side of the spool shaft support portion 37b. The second end portion 9b is rotatably supported by the spool shaft support portion 37b via a bearing 41b.

The central portion 9c is located between the first end portion 9a and the second end portion 9b. The central portion 9c is located on the side of first flange 46 of the spool 11, which flange will be described further below. For example, the central portion 9c is located on the side of the first body portion 25. Specifically, the central portion 9c is located on the side of the first side plate 33a, and is rotatably supported by the first side plate 33a via a bearing 41c.

Figure 3:
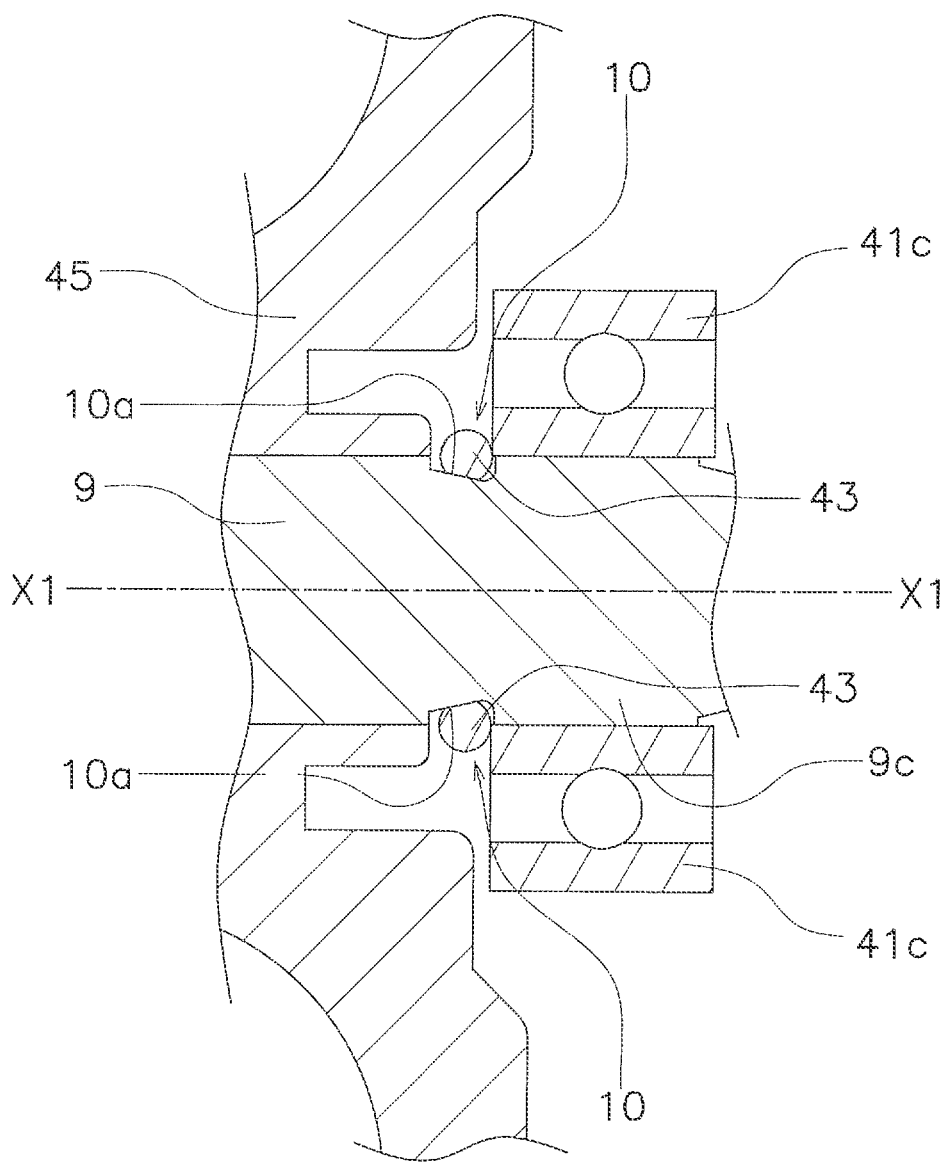
FIG. 3 is a partially enlarged cross-sectional view of the central region of the spool shaft.

As shown in FIG. 3, the annular groove 10 is disposed on the outer circumferential surface of the spool shaft 9, and is located between the bearing 41c and a bobbin trunk 45 of the spool 11 in the axial direction; the bobbin trunk will be described further below. An O-ring 43 is installed in the annular groove 10.

A bottom surface 10a of the annular groove 10 expands or increases in diameter from the wall surface on the first end portion 9a side to the wall surface on the second end portion 9b side. With this configuration, when the O-ring 43 is installed or disposed in the bottom surface 10a of the annular groove 10, the O-ring 43 presses against the inner race of the bearing 41c. A gap is provided between the O-ring 43 and the axial end of the bobbin trunk 45.

Spool

As shown in FIG. 2, the spool 11 is mounted on the spool shaft 9. The spool 11 integrally rotates with the spool shaft 9. The spool 11 includes the bobbin trunk 45, the first flange 46, the second flange 47, and a cylindrical portion 49. Fishing line is wound around the bobbin trunk 45, and the bobbin trunk 45 is mounted on the outer circumferential surface of the spool shaft 9 so as to integrally rotate with the spool shaft 9.

Figure 4:
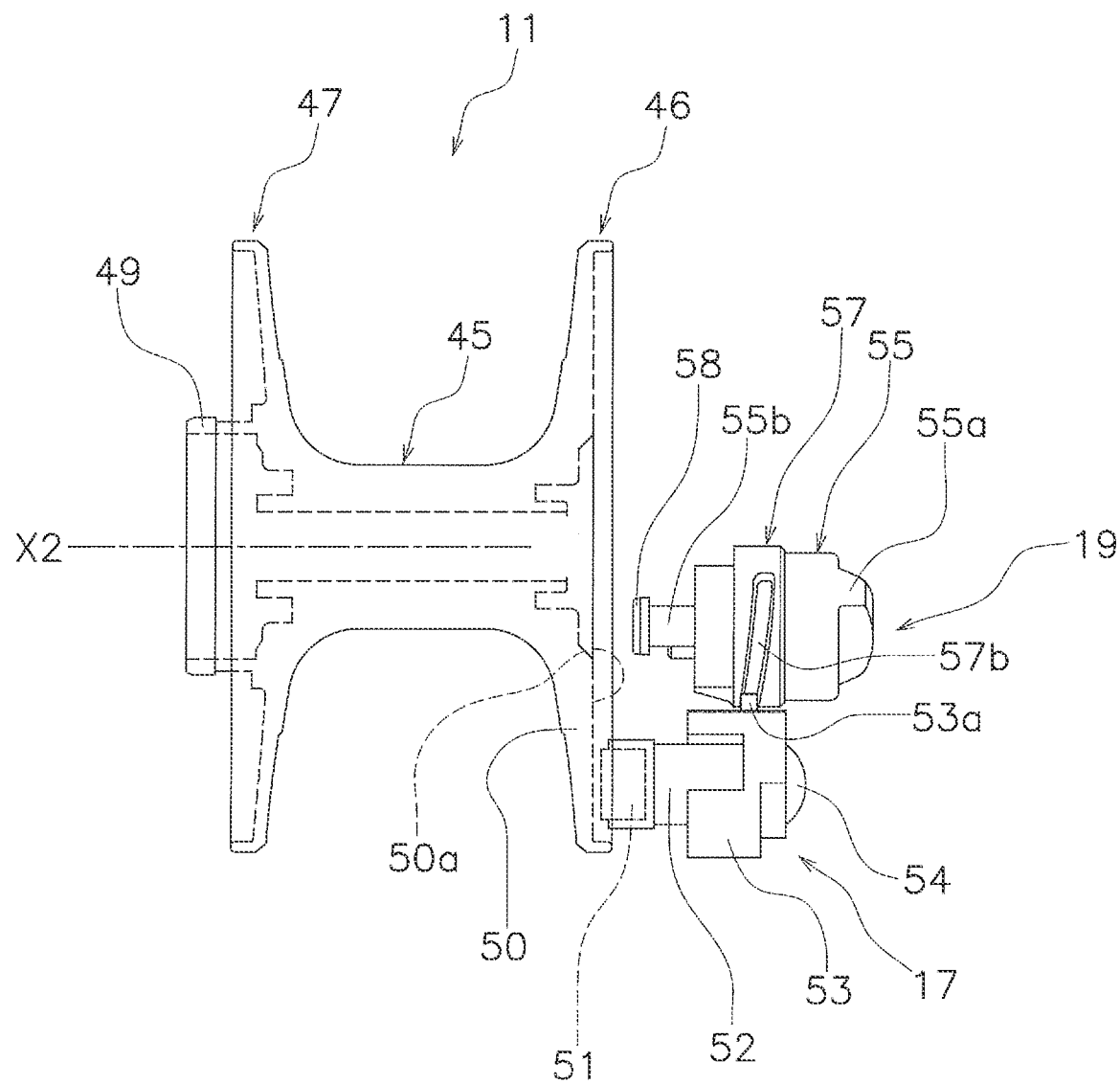
FIG. 4 is a diagram of the spool, first braking unit, first adjustment unit, second braking unit, and second adjustment unit as viewed from the outside in the radial direction.

As shown in FIG. 4, the first and second flanges 46, 47 are located at either end of the bobbin trunk 45, such that they are arranged opposite each other and extend radially outwardly from the bobbin trunk 45. In one embodiment, the first and second flanges 46, 47 are integrally formed with the bobbin trunk 45.

As shown in FIG. 2, the first flange 46 is disposed on the side of the first side plate 33a. As shown in FIG. 4, at least part of the first flange 46 includes a magnetic portion 50. The magnetic portion 50 is formed from a material that can be magnetized. In one embodiment, the entire first flange 46 is composed of the magnetic portion 50. Moreover, the entire spool 11 can be composed of the magnetic portion 50. The magnetic portion 50 can be subjected to magnetization.

In the present embodiment, an example is shown in which the magnetic portion 50 is integrally formed with the body portion of the first flange 46. The first flange 46 can be formed by attaching a separate magnetic portion 50 to the magnetic portion of the first flange 46.

The first flange 46, i.e., the magnetic portion 50, has a flat surface 50a. The flat surface 50a forms the axial outer surface of the magnetic portion 50, and is orthogonal to axis of rotation X2 of the spool 11 and is formed in an annular shape in the circumferential direction around axis of rotation X2 of the spool 11. The flat surface 50a faces to a magnet 51 of the first braking unit 17, which magnet is described further below.

As shown in FIG. 2, the second flange 47 is located on the side of the second side plate 37a. As shown in FIG. 4, the second flange 47 is disposed facing the spool shaft support portion 37b in the axial direction. The thickness of the thinnest portion of the second flange 47 is less than the thickness of the thinnest portion of the first flange 46.

The cylindrical portion 49 is formed integrally with the bobbin trunk 45, and protrudes axially from the bobbin trunk 45. The cylindrical portion 49 supports the second braking unit 21, and integrally rotates with the second braking unit 21. The cylindrical portion 49 is positioned radially inward of the contact ring 37c, described further below.

Level-Wind Mechanism

As shown in FIGS. 1 and 2, the level-wind mechanism 13 moves a fishing line guide along the axial direction in reciprocating fashion in conjunction with the rotation of the spool 11. For example, as shown in FIG. 2, the rotation of the spool 11 is transmitted to the level-wind mechanism 13 via the spool shaft 9 and the rotation transmission mechanism 15. As a result, the fishing line guide moves back and forth in the axial direction of the spool shaft 9 in the level-wind mechanism 13.

The level-wind mechanism 13 is disposed between the first body portion 25 and the second body portion 27 in the axial direction. Since the structure of the level-wind mechanism 13 and a conventional level-wind mechanism are the same, a detailed description of the level-wind mechanism 13 is omitted here.

Rotation Transmission Mechanism

Figure 5:
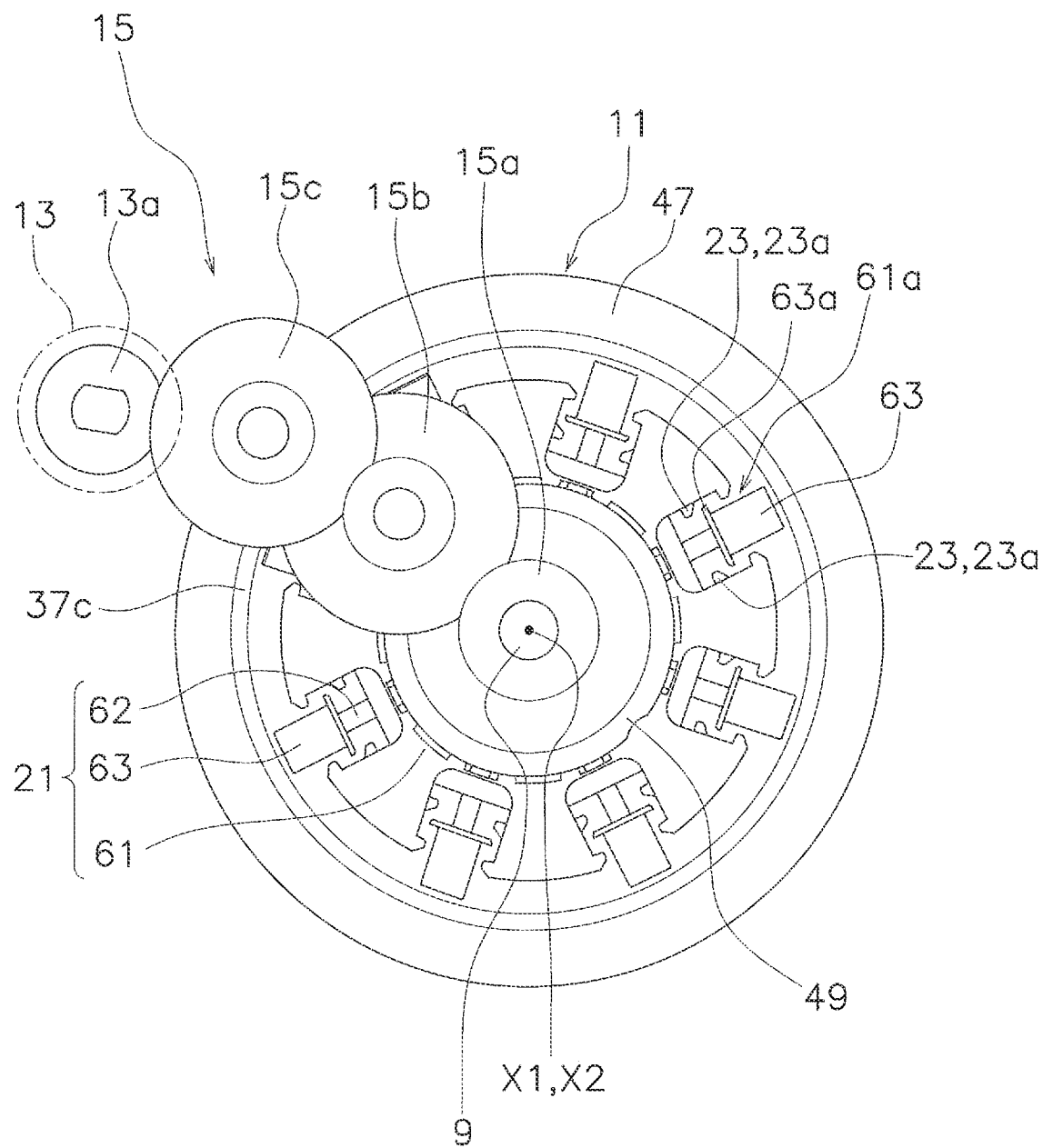
FIG. 5 is a diagram of the rotation transmission mechanism, second braking unit, second adjustment unit, and spool as viewed from the outside in the axial direction.

As shown in FIG. 2, the rotation transmission mechanism 15 transmits the rotation of the spool 11 to the level-wind mechanism 13. The rotation transmission mechanism 15 is located in the second body portion 27. As shown in FIG. 5, the rotation transmission mechanism 15 includes a first gear 15a, a second gear 15b, and a third gear 15c. The first gear 15a is disposed on the spool shaft 9, and integrally rotates with the spool shaft 9.

The second gear 15b is rotatably supported by the second frame 37, for example, the spool shaft support portion 37b. The second gear 15b meshes with the first gear 15a and the third gear 15c. The third gear 15c is rotatably supported by the second frame 37, for example, the second side plate 37a. The third gear 15c meshes with the second gear 15b and a passive gear 13a of the level-wind mechanism 13.

First Braking Unit

Figure 6:
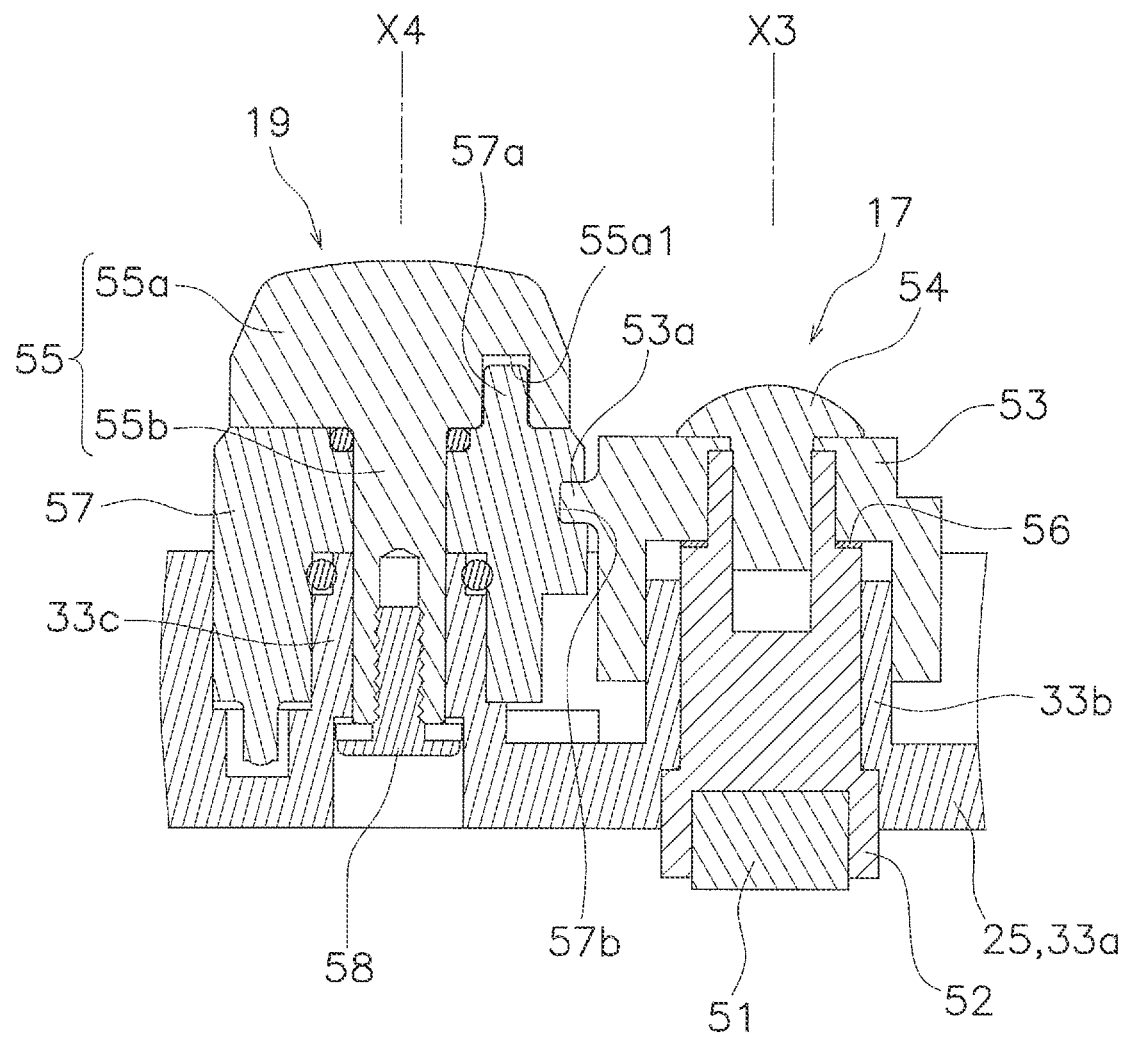
FIG. 6 is a partially enlarged cross-sectional view of the first braking unit, first adjustment unit, second braking unit, and second adjustment unit.

As shown in FIGS. 4 and 6, the first braking unit 17 brakes the rotation of the spool 11. The first braking unit 17 moves in the axial direction approaching the first flange 46 and in the axial direction away from the first flange 46. As shown in FIG. 2, the first braking unit 17 is arranged in the first body portion 25 facing the first flange 46.

For example, as shown in FIGS. 4 and 6, the first braking unit 17 is a magnetic brake. The first braking unit 17 comprises the magnet 51 (one example of the magnet portion), a magnet holder 52, and a driven cam 53.

As shown in FIG. 4, the magnet 51 is disposed facing the first flange 46. For example, the magnet 51 is located facing the magnet 50 of the first flange 46. Specifically, the magnet 51 is located between the flat surface 50a of the first flange 46 and the first side plate 33a (see FIG. 2) in the axial direction. The rotation of the spool 11 is braked by the magnetic force of the magnet 51, which acts on the flat surface 50a of the first flange 46.

As shown in FIGS. 4 and 6, the magnet holder 52 holds the magnet 51. As shown in FIG. 6, the magnet holder 52 is disposed so as to be movable in the axial direction with respect to the first body portion 25, for example, the first side plate 33a. The magnet holder 52 is disposed inside a boss portion 33b of the first side plate 33a.

The boss portion 33b protrudes from the first side plate 33a toward the first side cover 35, and has a central axis X3 that is parallel to the axis X1 of the spool shaft 9. The magnet holder 52 is disposed inside the boss portion 33b so as to be non-rotatable with respect to the boss portion 33b about central axis X3 and movable with respect to the boss portion 33b in the axial direction along central axis X3 of the boss portion 33b.

As shown in FIGS. 4 and 6, the driven cam 53 is attached to the magnet holder 52. For example, as shown in FIG. 6, the driven cam 53 is attached to the magnet holder 52 via a washer 56. The driven cam 53 is fixed to the magnet holder 52 by a fixing screw 54.

The driven cam 53 is attached to the magnet holder 52 so as to be non-rotatable with respect to the magnet holder 52 about the central axis X3 of the boss portion 33b and movable in the axial direction along the central axis X3 of the boss portion 33b together with the magnet holder 52.

As shown in FIGS. 4 and 6, the driven cam 53 has a cam protrusion 53a. The cam protrusion 53a is disposed on the outer surface of the driven cam 53. The cam protrusion 53a protrudes from the outer surface of the driven cam 53 in a radial direction away from central axis X3 of the boss portion 33b.

First Adjustment Unit

As shown in FIGS. 4 and 6, the first adjustment unit 19 adjusts a first braking force with which the first braking unit 17 brakes the rotation of the spool 11. For example, the first adjustment unit 19 moves the magnet 51 of the first braking unit 17 in the axial direction to approach the magnetic portion 50 of the first flange 46 and in the axial direction away from the magnetic portion 50 of the first flange 46.

Specifically, as shown in FIG. 4, the first adjustment unit 19 moves the magnet 51 of the first braking unit 17 in the axial direction to approach the flat surface 50a of the first flange 46 and in the axial direction away from the flat surface 50a of the first flange 46. This movement changes the distance between the first flange 46 and the magnet 51 of the first braking unit 17, thereby adjusting the first braking force.

As shown in FIG. 6, the first adjustment unit 19 is disposed in the first body portion 25. As shown in FIGS. 4 and 6, the first adjustment unit 19 includes a control knob 55 and a control cam 57. The control knob 55 is attached to the first side plate 33a on the side of the first side cover 35, and is attached to the first side plate 33a so as to be rotatable with respect to the first side plate 33a.

As shown in FIG. 6, the control knob 55 is disposed on a boss portion 33c of the first side plate 33a. For example, the boss portion 33c protrudes from the first side plate 33a toward the first side cover 35. The boss portion 33c has a central axis X4 that is parallel to axis X1 of the spool shaft 9.

As shown in FIGS. 4 and 6, the control knob 55 includes a knob portion 55a and a mounting portion 55b. As shown in FIG. 6, the knob portion 55a is separated from the first side plate 33a in the axial direction along central axis X4 of the boss portion 33c.

The mounting portion 55b is integrally formed with the knob portion 55a, and is in the form of a shaft. The mounting portion 55b is disposed on the boss portion 33c of the first side plate 33a, and is positioned on the first side plate 33a by a fastening member, e.g., a screw 58. For example, the mounting portion 55b is positioned on the first side plate 33a from the first flange 46 side by means of the screw 58.

The control cam 57 is arranged between the first side plate 33a and the knob portion 55a of the control knob 55 in the axial direction along central axis X4 of the boss portion 33c. The control cam 57 engages the control knob 55 so as to rotate integrally with the control knob 55.

As shown in FIG. 6, the control cam 57 includes a locking projection 57a and a cam groove 57b (see FIG. 4). The locking projection 57a engages the control knob 55. For example, the locking projection 57a engages a hole portion 55a1 in the knob portion 55a. Thus, the control cam 57 rotates integrally with the control knob 55.

As shown in FIG. 4, the cam groove 57b is disposed on the outer circumferential surface of the control knob 55. For example, the cam groove 57b extends in the form of a spiral on the outer circumferential surface of the control knob 55. The cam protrusion 53a of the driven cam 53 engages the cam groove 57b.

When the control knob 55 rotates around the central axis X4 of the boss portion 33c, the control cam 57 rotates around central axis X3 of the boss portion 33c together with the control knob 55. In this embodiment, the cam protrusion 53a of the driven cam 53 is pressed in the axial direction along central axis X3 of the boss portion 33b by the wall of the cam groove 57b of the control cam 57. As a result, the driven cam 53, the magnet holder 52, and the magnet 51 move in the axial direction along central axis X3 of the boss portion 33b.

For example, in the state shown in FIG. 6, when the control knob 55 and the control cam 57 rotate in a first direction of rotation, the magnet 51 approaches the flat surface 50a of the first flange 46. In this state, when the control knob 55 and the control cam 57 rotate in a second direction of rotation opposite to the first direction of rotation, the magnet 51 moves away from the flat surface 50a of the first flange 46.

The operation of the control knob 55 and the control cam 57 in this manner changes the distance between the magnet 51 of the first braking unit 17 and the first flange 46. This change in distance adjusts the first braking force.

Second Braking Unit

As shown in FIG. 2, the second braking unit 21 is arranged in the second body portion 27. As shown in FIG. 5, the second braking unit 21 brakes the rotation of the spool 11. In one embodiment, the second braking unit 21 comes into contact with the second body portion 27 as the spool 11 rotates to brake the rotation of the spool 11 by the force of friction.

For example, as shown in FIG. 5, the second braking unit 21 is a centrifugal brake. The second braking unit 21 comprises a support portion 61, a plurality of support shafts 62, and a plurality of contact portions 63.

The support portion 61 has an annular form, and integrally rotates with the spool 11. For example, the support portion 61 is fixed to the outer circumferential surface of the cylindrical portion 49 of the spool 11. The support portion 61 has a plurality of housing recesses 61a disposed on the outer circumferential surface of the support portion 61 separated from each other at prescribed intervals.

The plurality of support shafts 62 are fixed to the support portion 61 separately from each other at prescribed intervals in the circumferential direction. For example, each of the plurality of support shafts 62 are fixed to the bottom of the plurality of housing recesses 61a, and extends in the radial direction.

The plurality of contact portions 63 contact the contact ring 37c. The plurality of contact portions 63 are disposed between the contact ring 37c and the bottom of the plurality of housing recesses 61a in the radial direction. Each contact portion 63 is supported by each support shaft 62 so as to be movable in the radial direction along each support shaft 62. For example, each contact portion 63 is in the form of a hat.

In the second braking unit 21, a centrifugal force acts on the plurality of contact portions 63 due to the rotation of the spool 11. The plurality of contact portions 63 move radially along the plurality of support shafts 62 by this centrifugal force and contact the contact ring 37c. When the plurality of contact portions 63 are in contact with the contact ring 37c, the force of friction is generated on the plurality of contact portions 63 and the contact ring 37c. This friction force brakes the spool 11.

Second Adjustment Unit

As shown in FIG. 2, the second adjustment unit 23 is located in the second body portion 27. As shown in FIG. 5, the second adjustment unit 23 adjusts the second braking force with which the second braking unit 21 brakes the rotation of the spool 11.

The second adjustment unit 23 is configured to be capable of regulating the contact between at least one of the plurality of contact portions 63 and the contact ring 37c. For example, the second adjustment unit 23 has a plurality of pairs of pawls 23a. Each pair of the pawls 23a is disposed in each of the plurality of housing recesses 61a. More specifically, each pair of the pawls 23a protrudes from mutual contact wall portions in each of the housing recesses 61a so as to be able to engage flanges 63a of the respective contact portions 63.

In the second adjustment unit 23, when at least one flange 63a of the plurality of contact portions 63 is positioned between the pair of pawls 23a and the bottom of the housing recess 61a in the radial direction, the radial movement of at least one of the plurality of contact portions 63 is regulated. At least one of the plurality of contact portions 63 that is regulated here does not come in contact with the contact ring 37c.

When at least one flange 63a of the plurality of contact portions 63 is positioned between one pair of pawls 23a and the contact ring 37c in the radial direction, at least one of the plurality of contact portions 63 can move in the radial direction. Here, at least one of the plurality of contact portions 63 positioned so as to be movable comes in contact with the contact ring 37c. In this manner, in the second adjustment unit 23, the second braking force is adjusted through selective contact of the contact portion 63 with the contact ring 37c.

The dual-bearing reel 1 described above has the following features. In the dual-bearing reel 1, the first braking unit 17 is located in the first body portion 25 and the rotation transmission mechanism 15 is located in the second body portion 27. In this state, the first braking unit 17 is disposed to facing the first flange 46 of the spool 11 and brake the rotation of the spool 11. With this configuration, the first braking unit 17 can brake the rotation of the spool 11 directly via the first flange 46. That is, in this dual-bearing reel 1, the rotation of the spool 11 can be braked efficiently.

In the dual-bearing reel 1, the first braking force of the first braking unit 17 is adjusted by the first adjustment unit 19, so that the first braking force can be easily adjusted as desired by the angler.

In the dual-bearing reel 1, the magnet 51 of the first braking unit 17 is disposed facing the magnetic portion 50 of the first flange 46 in order to brake the rotation of the spool 11. With this configuration, the rotation of the spool 11 can be braked efficiently without bringing the first braking unit 17 in contact with the first flange 46 of the spool 11.

In the dual-bearing reel 1, the magnet 51 of the first braking unit 17 can be positioned facing the flat surface 50a of the magnetic portion 50 of the first flange 46 in order to brake the rotation of the spool 11 more efficiently.

In the dual-bearing reel 1, the first braking force can be easily adjusted as desired by the angler by simply changing the distance between the magnetic portion 50 and the magnet 51.

In the dual-bearing reel 1, the first braking unit 17 and the drive mechanism 7 are located in the first body portion 25. The rotation transmission mechanism 15 is located in the second body portion 27. Even with this configuration, the first braking unit 17 can brake the first flange 46 of the spool 11 directly. That is, this dual-bearing reel 1 can efficiently brake the rotation of the spool 11.

In the dual-bearing reel 1, the first braking unit 17 is located in the first body portion 25 and brakes the rotation of the spool 11. The second braking unit 21 is located in the second body portion 27 and brakes the rotation of the spool 11. With this configuration, the rotation of the spool 11 can be braked by both the first braking unit 17 and the second braking unit 21.

In the dual-bearing reel 1, the second braking unit 21 contacts the second body portion 27 as the spool 11 rotates, thereby generating friction force on the spool 11. This allows the rotation of the spool 11 to be directly braked. That is, this dual-bearing reel 1 can efficiently brake the rotation of the spool 11.

In the dual-bearing reel 1, the second braking force of the second braking unit 21 is adjusted by the second adjustment unit 23, so that the second braking force can be easily adjusted as desired by the angler.

Modified Examples

Although embodiments of the present disclosure were presented above, the present disclosure is not limited to the above-described embodiments, but can be modified in various ways without departing from the essence of the disclosure.

Figure 7:
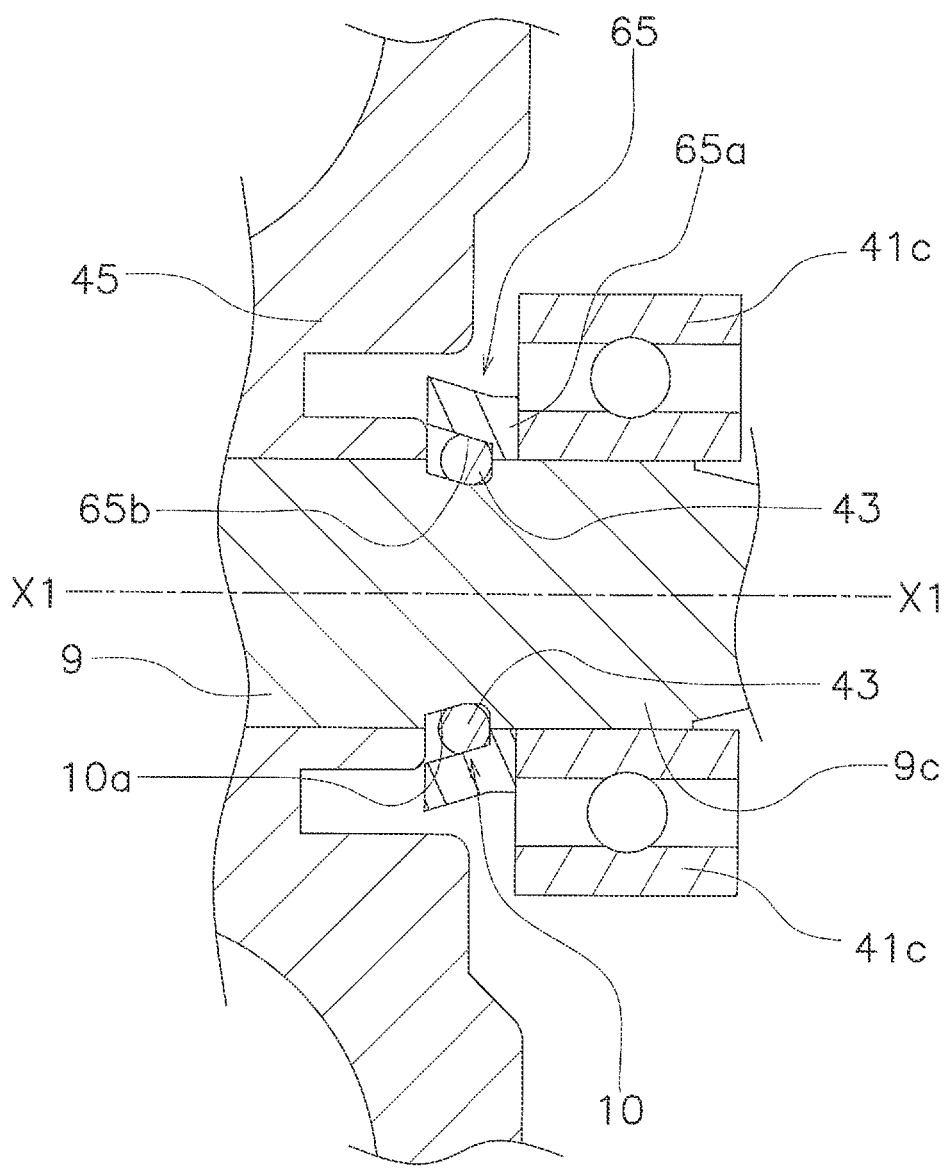
FIG. 7 is a partially enlarged cross-sectional view of the central region of the spool shaft in a modified example.

In the embodiments described above, an example was shown which the O-ring 43 is disposed in the annular groove 10, and the O-ring 43 presses against the inner race of the bearing 41c. The configuration for pressing against the inner race of the bearing 41c can be configured as shown in FIG. 7.

In this embodiment, a tubular member 65 is disposed on the radially outward side of the O-ring 43. One end portion 65a of the tubular member 65 is disposed on the outer circumferential surface of the spool shaft 9. The one end portion 65a of the tubular member 65 comes in contact with the inner race of the bearing 41c.

The inner circumferential surface 65b of the tubular member 65 expands or increases in diameter from the one end portion 65a of the tubular member 65 toward the other end portion of the tubular member 65. In this configuration, the O-ring 43 presses against the inner circumferential surface of the tubular member 65 when it is installed in the bottom surface 10a of the annular groove 10. The tubular member 65 presses against the inner race of the bearing 41c by means of the pressing force of the O-ring 43. A gap is provided between the tubular member 65 and the axial end of the bobbin trunk 45.

What is claimed is:

1. A dual bearing reel, comprising:
   a spool comprising a bobbin trunk around which fishing line is configured to be wound and first and second flanges disposed on each end portion of the bobbin trunk and extending radially from the bobbin trunk;
   a spool shaft including a first supported portion on a first flange side and a second supported portion on a second flange side, and the spool shaft configured to integrally rotate with the spool,
   a reel body including a first body portion rotatably supporting the first supported portion and a second body portion rotatably supporting the second supported portion;
   a level-wind mechanism configured to move a fishing line guide along an axial direction of the spool shaft in reciprocating fashion in conjunction with the rotation of the spool;
   a first braking unit disposed in the first body portion facing the first flange and configured to brake the rotation of the spool, and
   a rotation transmission mechanism disposed in the second body portion and configured to transmit the rotation of the spool to the level-wind mechanism,
   the first flange disposed adjacent the braking unit and configured to brake rotation of the spool.

2. The dual-bearing reel according to claim 1, further comprising a first adjustment unit disposed in the first body portion and configured to adjust a braking force with which the first braking unit is configured to brake the rotation of the spool.

3. The dual-bearing reel according to claim 2, wherein the first flange includes a magnetic portion,
   the first braking unit has a magnet portion disposed facing the magnetic portion, and
   the first adjustment unit is configured to adjust the braking force by changing a distance between the magnetic portion and the magnet portion.

4. The dual-bearing reel according to claim 1, wherein the first flange includes a magnetic portion, and
   the first braking unit has a magnet portion disposed facing the magnetic portion.

5. The dual-bearing reel according to claim 4, wherein the magnetic portion has a flat surface facing the magnet portion.

6. The dual-bearing reel according to claim 1, wherein the first braking unit faces a surface of the first flange that extends generally perpendicular to the axial direction of the spool shaft.

7. A dual-bearing reel comprising:
   a spool comprising a bobbin trunk around which fishing line is configured to be wound and first and second flanges disposed on each end portion of the bobbin trunk and extending radially from the bobbin trunk;
   a spool shaft including a first supported portion on a first flange side and a second supported portion on a second flange side, and the spool shaft configured to integrally rotate with the spool,
   a reel body including a first body portion rotatably supporting the first supported portion and a second body portion rotatably supporting the second supported portion;
   a level-wind mechanism configured to move a fishing line guide along an axial direction of the spool shaft in reciprocating fashion in conjunction with the rotation of the spool;
   a first braking unit disposed in the first body portion facing the first flange and configured to brake the rotation of the spool;
   a rotation transmission mechanism disposed in the second body portion and configured to transmit the rotation of the spool to the level-wind mechanism; and
   a drive mechanism disposed in the first body portion and configured to transmit rotation of a handle to the spool.

8. A dual-bearing reel comprising:
   a spool comprising a bobbin trunk around which fishing line is configured to be wound and first and second flanges disposed on each end portion of the bobbin trunk and extending radially from the bobbin trunk;
   a spool shaft including a first supported portion on a first flange side and a second supported portion on a second flange side, and the spool shaft configured to integrally rotate with the spool,
   a reel body including a first body portion rotatably supporting the first supported portion and a second body portion rotatably supporting the second supported portion;
   a level-wind mechanism configured to move a fishing line guide along an axial direction of the spool shaft in reciprocating fashion in conjunction with the rotation of the spool;
   a first braking unit disposed in the first body portion facing the first flange and configured to brake the rotation of the spool;

a rotation transmission mechanism disposed in the second body portion and configured to transmit the rotation of the spool to the level-wind mechanism, and
  a second braking unit disposed in the second body portion, and the second brake is configured to brake the rotation of the spool,
  the second braking unit contacting the second body portion when the spool rotates to brake the spool by a friction force.

9. The dual-bearing reel according to claim 8, further comprising
  a second adjustment unit disposed in the second body portion and configured to adjust a second braking force with which the second adjustment unit is configured to brake the rotation of the spool.

10. A dual-bearing reel comprising:
  a spool comprising a bobbin trunk around which fishing line is configured to be wound and first and second flanges disposed on each end portion of the bobbin trunk and extending radially from the bobbin trunk;
  a spool shaft including a first supported portion on a first flange side and a second supported portion on a second flange side, and the spool shaft configured to integrally rotate with the spool,
  a reel body including a first body portion rotatably supporting the first supported portion and a second body portion rotatably supporting the second supported portion;
  a level-wind mechanism configured to move a fishing line guide along an axial direction of the spool shaft in reciprocating fashion in conjunction with the rotation of the spool;
  a first braking unit disposed in the first body portion facing the first flange and configured to brake the rotation of the spool;
  a rotation transmission mechanism disposed in the second body portion and configured to transmit the rotation of the spool to the level-wind mechanism,
  the first flange extending in a radial direction and configured to brake rotation of the spool.

\* \* \* \* \*